Nov. 3, 1936.　　　J. L. KIMBALL　　　2,059,362
HEAT CONTROL
Filed April 28, 1934　　　2 Sheets-Sheet 1

James L. Kimball
INVENTOR.

Nov. 3, 1936.  J. L. KIMBALL  2,059,362
HEAT CONTROL
Filed April 28, 1934  2 Sheets-Sheet 2

James L Kimball
INVENTOR

UNITED STATES PATENT OFFICE 2,059,362

HEAT CONTROL

James Lewis Kimball, Danvers, Mass., assignor to Ruggles-Klingemann Mfg. Co., Salem, Mass.

Application April 28, 1934, Serial No. 722,954

16 Claims. (Cl. 236—68)

My invention relates to an improved method for controlling room temperature in which a thermostat control is employed to regulate the supply of heating medium, and is especially adapted to the control of steam heating systems.

The principal object of my invention is to prevent over correction due to time lag in radiating and dissipating the heat of the room to be controlled.

To accomplish this result, I have devised control equipment so arranged that the heating medium is controlled in definite steps of operation with a predetermined time interval between steps. I then arrange to supply false heat to the thermostat and to vary this supply of false heat in accordance with variation in the supply of steam to the heating system. The result is that the thermostat feels variations in the supply of false heat almost immediately, thereby anticipating the rise or fall in room temperature and preventing a condition of over correction in either direction.

When I supply steam heat to the heating system, I also supply additional electric current to an electric heating unit located near the thermostat blade and, likewise, as I close off heat from the heating system, I reduce the heat in the heating unit.

Such a method of control has a decided advantage in that it tends to progressively center the heat controlling means at a position which corresponds with the predetermined required temperature.

In the accompanying drawings which form a part of the present specification, I have illustrated one embodiment in which my invention may appear.

Figure 1:
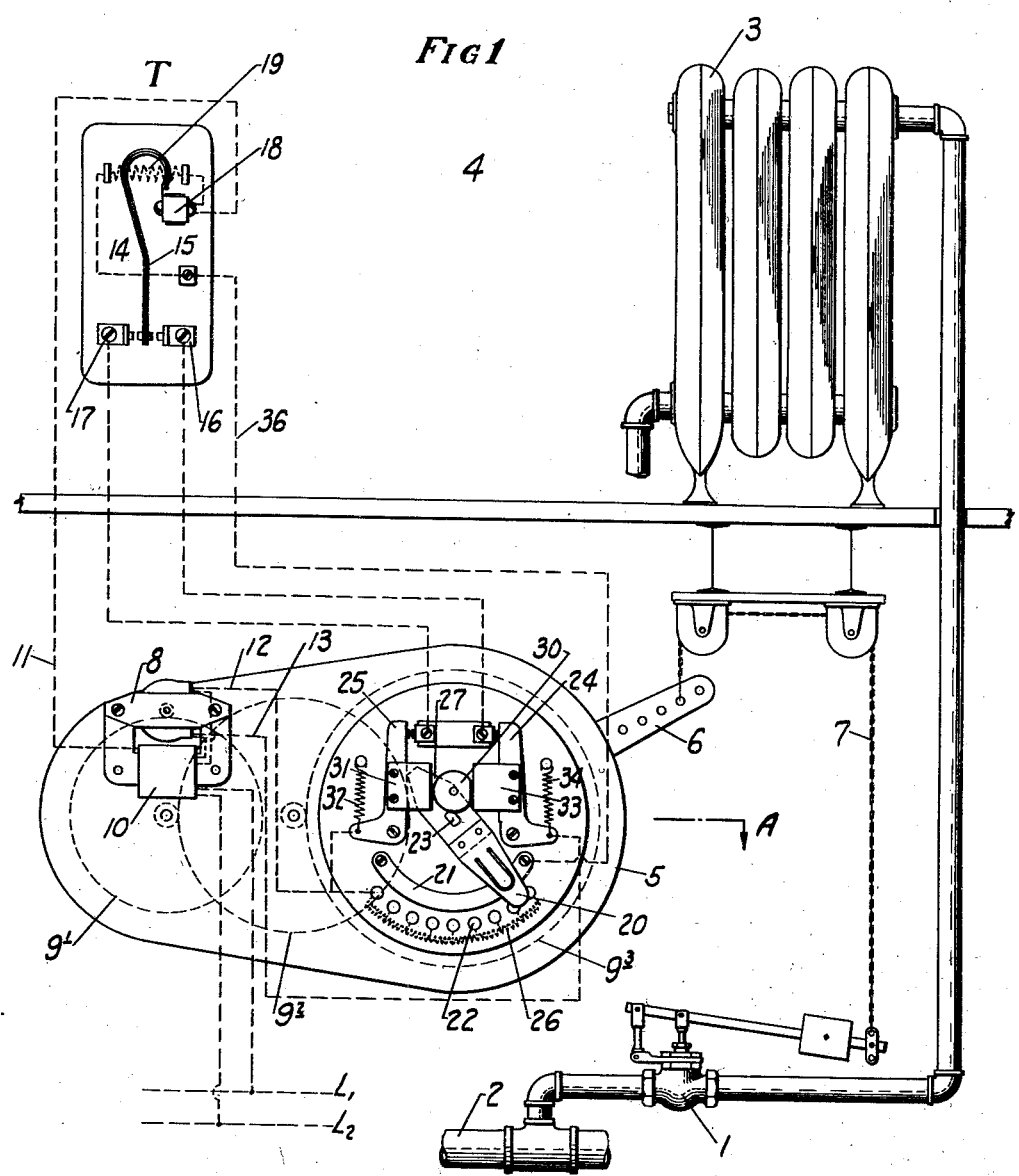
Fig. 1 shows a vertical elevation partly diagrammatic of mechanism for carrying out one embodiment of my invention, a timing motor used in the operation of cam (30) being omitted from Fig. 1 but shown in Fig. 2.

In a preferred embodiment of my invention covering improved method and apparatus for heat control in heating systems, is the example illustrated: a valve (1) supplies steam from header (2) to radiator (3) or other equivalent apparatus for the control of the application of heat to the space heated. Valve (1) is controlled by regulator (5) having operating arm (6) and connection (7) for the operation of valve (1).

The invention is equally applicable to the control of combustion as in the regulation of hot water, hot air or steam generating heaters. In such applications, the connection (7) would control the damper operation to regulate the air supply to said heaters in accordance with the temperature of the space to be heated.

The invention is applicable to the control of dampers in either hot air or cold air supply ducts in direct or indirect heating systems, or for the control of unit heaters, also applicable to refrigerating systems.

In the illustrated embodiment of my invention, arm (6) is operated by a motor (8) through suitable speed reduction gearing $(9^1)$ $(9^2)$ and $(9^3)$. The primary coil of motor (8) is connected with suitable line current supply at $(L^1)$ and $(L^2)$. A preferred type of motor for this purpose is what is known as a shade field motor having a secondary control circuit for a forward and reverse operation of the motor, although other types of electrically reversible motors may be used, either direct or alternating current motors.

In the type of motor illustrated, current from line $(L^1)$ and $(L^2)$ is on the primary coil (10) continuously, but no rotation of the armature takes place in either direction until the control circuit is closed. Line (11) is the neutral feeder and when this line is contacted with line (12) the motor operates in one direction, and when contacted with line (13) the motor operates in the reverse direction. The current is transformed in the primary coil (10) so the control circuit has a lower voltage than that supplied from line $(L^1)$ and $(L^2)$ and consequently makes this type of motor especially suited for direct operation from thermostatic control.

Located in room (4) and subjected to the temperature of the space to be heated is a thermostat (T). This can be one of the several well known types used for the control of room temperature and commonly constructed with what is known as a bimetal blade (15), which is responsive to variations in temperature, permitting its free end to contact with either (16) or (17) and thereby complete an electric circuit for the control of said temperature. The opposite end of the bimetal blade (15) is secured to post or abutment (18), made from material which insulates the blade from the base (14).

Such thermostats may be calibrated for any predetermined temperature or they may be provided with means for manual adjustment over a predetermined range. Between the base (14) and the blade (15) and located directly under the curved portion of the blade, is an electric heating coil (19). This coil is energized and the degree of heat dissipated is controlled by a rheostat operated by motor (8) in synchronous relation with the operation of valve (1), the resistance units or coils (26) regulating the degree of heat which the heating unit (19) will dissipate through the operation of the dial switch blade (20).

The arm (6) is secured to a shaft driven by the low speed gear (9³) and to the opposite end of this shaft designated as (23) is attached an operating member (27), constructed of insulating material. This member (27) is arranged to open either one or the other limit switches (24) or (25) on a predetermined angular movement of the arm (6) and thereby limit the operation of arm (6) to what is required to open and close valve (1). To the opposite end of this operating member is attached the dial switch blade (20) which is arranged to contact with segment (21) and also contact with the various contact points (22) which controls the amount of resistance (26) in circuit with the heating unit (19).

Figure 2:
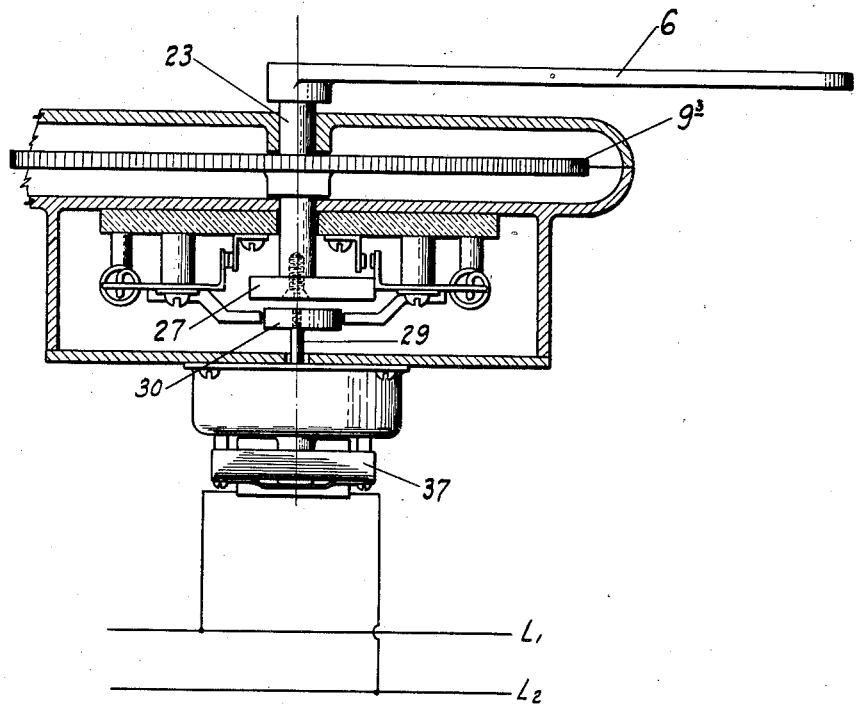
Fig. 2 shows a plan view taken on a line of section "A" of Fig. 1, a part being in section, of the application of the timing motor to the control of the limit switches. Like parts are indicated by similar numerals in both drawings.

A timing motor is provided, as shown in Fig. 2, which comprises a synchronous motor, such as employed in the operation of electric clocks, in which the speed of the motor is dependent upon the frequency of the energizing alternating current which operates the motor.

At least one make of motor of this type, which I find suitable for carrying out the objects of my invention, has its own speed reduction gearing all assembled as a self-contained unit. Such motors have a driving shaft which usually operates at one revolution per minute and this I find suitable for a majority of the conditions encountered.

This motor is shown at (37) in front of the switch box casing and having its shaft (29) extending within the casing with a cam (30) mounted on the end of said shaft, said motor being electrically connected to a supply of alternating current as shown, to operate said motor and said cam.

Now, referring again to Fig. 1, it will be noted that this cam is holding limit switch (25) open while limit switch (24) is closed. The rotation of this cam alternately closes first one then the other limit switch every 30 seconds or in such periods of time as are found desirable to meet the prevailing conditions. At all other times motor (8) is not operative even though the thermostat (7) may be closed either at the hot or cold position.

I will now explain the operation of my invention. Assuming the room temperature is below normal, then blade (15) of the thermostat will contact at (17) but no operation of the motor (8) takes place for the reason that limit switch (25) is open, but as cam (30) revolves it presents its flat side to the abutment (31) allowing this switch to momentarily close by the spring, at which time current will flow from control line (11) through the thermostat blade (15) to contact (17) thence back through the limit switch (25) and through line (12) to the motor. This will operate the motor in a direction to open the valve (1), at the same time it will operate rheostat blade (20) to the left, thus cutting out a portion of the resistance and supplying additional current to the heating element (19) to generate additional heat. The current for this purpose will flow from control line (11) through the heating element (19) thence through conductor (36) to segment (21), thence through the remaining resistance to line (12) and the motor. This false or artificial heat tends to center the thermostat blade in its neutral position as shown in anticipation of the rise in temperature which will take place when the additional steam supply now in transit becomes effective in raising the room temperature. If the heat in transit, and the false heat applied to the thermostat blade, is not sufficient to center the blade at its neutral position, then the operation is repeated, further false heat being applied by the heating element and additional steam supplied to the heating system. This operation is continued until a balance is reached between false heat and effective room temperature to center the thermostat at its neutral position. Thereafter the control becomes non-responsive and valve (1) remains in its throttled position supplying the required amount of heating medium to maintain the room temperature at its predetermined value until such time as a change in room temperature takes place.

Assuming that the room temperature becomes slightly too warm, and the thermostat blade makes contact at (16), then current will flow from control circuit (11) through the thermostat blade to contact (16), thence through limit switch (24), when cam (30) is in the position shown, and back to the motor through line (13). This will cause the motor (8) to operate in the opposite direction and close the valve one or more steps of operation, at the same time increasing the amount of resistance to the flow of current to the heating element (19) and causing the thermostat blade to tend to return to its neutral position. If one operation is not sufficient to return the room temperature to normal, then the operation is repeated at the end of the one minute period until a balance is reached the same as in the opening movement of the valve.

It should be understood that the amount of current which can pass through the heating unit is not sufficient to interfere with the operation of the motor (8), even when this flow is in the opposite direction to that required to operate the motor. Stated in another way, the current which can pass through the heating element, even with the resistance of the rheostat all out, is not sufficient to operate the motor.

From the foregoing description of the operation of my invention, it will be understood that as I vary the supply of heating medium, I also vary the degree of heat dissipated by the heating element in the same direction in order to correct the thermostat setting in anticipation of a change in the room temperature, due to a change in valve setting and through time lag in radiating and dissipating such changes into variations in room temperature, otherwise an over correction would result with wide variations in room temperature.

The step action control of both the heating medium and the rheostat accomplishes two important objects. First; the period of rest between steps of operation gives time for the last step of operation in varying the supply of heating medium to make itself more or less effective in a change in the room temperature before proceeding to a further step of operation, and second; this time interval between steps of operation gives time for the variation of heat in the heating element to be transmitted to the thermostat blade before a further variation in heat content is effected.

Assuming the temperature in the space controlled is considerably below its normal requirements, then the heat in the heating element radiates much more rapidly and as a result the control may be moved several steps before the combined heat of the room temperature and that of the heating element is sufficient to center the thermostat at its neutral position. But as the heat in the space controlled approaches normal, the number of steps of operation will be progressively reduced until the proper balance is reached at the required temperature until such time as a change in the outside conditions affects the room temperature.

The foregoing specifications with the accompanying drawings are presented for the purpose of describing and illustrating the broad principles of this invention, and as various modifications are possible without departing from the spirit of the invention, I desire to have it understood that the invention is not to be restricted by reason of the specific construction or application disclosed, or otherwise than by the appended claims.

I claim:—

1. Method of heat control which comprises regulating the supply of heating medium to the space to be heated by an element responsive to variations in temperature from normal in said space, and advancing said element in advance of the return of the temperature to normal by means of false heat applied to said element and varied in accordance with the anticipated return of the temperature in the space heated to normal.

2. Method of heat control which comprises supplying the heating medium to the space to be heated in multiple steps of operation with a predetermined time interval between steps, regulating the steps of operation by an element responsive to variation in temperature from normal and advancing said element in advance of the return of the temperature to normal by means of false heat applied to said element and varied in accordance with variation in the supply of the heating medium.

3. Method of heat control which comprises regulating the supply of heating medium to the space to be heated by an element responsive to variations in temperature from normal in said space, and returning said element to normal in advance of the return of the temperature to normal by means of false heat applied to said element and varied in accordance with the anticipated return of the temperature in the space heated to normal.

4. Method of heat control which comprises regulating a supply of heating medium to the space to be heated in multiple steps of operation with a predetermined time interval between steps, controlling the regulating means by an element responsive to variations above and below its normal setting, and returning said element to its normal setting in advance of the return of the temperature to normal by means of false heat applied to said element and varied in accordance with variations in the supply of heating medium.

5. Apparatus for controlling the temperature of a space to maintain it in the neighborhood of a normal value having, in combination, means for supplying heat to said space to increase the temperature of said space, means for actuating the heat-supplying means to increase or decrease the heat supplied to said space, a thermostat in said space for controlling the actuating means, an additional source of heat for controlling the thermostat, and means for introducing a predetermined time interval between each increase and decrease of heat supply.

6. Apparatus for controlling the temperature of a space to maintain it in the neighborhood of a normal value having, in combination, means for supplying heat to said space to increase the temperature of said space, means for actuating the heat-supplying means to increase or decrease the heat supplied to said space, a thermostat in said space for controlling the actuating means, an additional source of heat for controlling the thermostat, and means for varying the heat supply of the additional source of heat in accordance with the degree of actuation of the actuating means.

7. Apparatus for controlling the temperature of a space to maintain it in the neighborhood of a normal value having, in combination, means for supplying heat to said space to increase the temperature of said space, means for actuating the heat-supplying means to increase or decrease the heat supplied to said space, said means comprising an electric circuit, a thermostat for controlling the circuit, and an electric heater for the thermostat connected with the circuit, and means for varying the energy supplied to the electric heater in accordance with the degree of actuation of the actuating means.

8. In a system for the regulation of a temperature, means to correct changes from a predetermined value in the temperature including a thermostat having a contacting element which moves in response to such changes, means to anticipate a return of said temperature to normal, comprising a heating element effective in influencing said thermostat to a position corresponding to a predetermined value of the temperature in advance of the return of the temperature to normal, and means to periodically interrupt the return of said temperature to normal to prevent over correction.

9. In a system for the control of variations in temperature from normal, comprising means for regulating a supply of heating medium to the space to be heated, a thermostat for controlling said means, an electric heating element arranged to supply artificial heat to said thermostat, and a rheostat operated by the heat regulating means for varying the degree of artificial heat in accordance with variations in the supply of heating medium.

10. In a system for the control of variations in temperature from normal, comprising means for varying a supply of heating medium to the space to be heated, said regulating means controlling the supply of heating medium in definite multiple steps of operation with a predetermined time interval between steps, an electric circuit and a thermostat in said circuit, said thermostat having a neutral position in which it is not effective, and two effective positions in which it controls the heat controlling means, an electric heating element arranged to supply artificial heat to the thermostat to return the thermostat to its neutral position in anticipation of the return of the temperature in the space heated to normal, and a rheostat operated by the heat controlling means arranged to vary the degree of artificial heat in accordance with variations in the supply of heating medium.

11. In a system for the control of variations in temperature from normal, comprising means for varying the supply of heating medium to the space to be heated, an electric circuit controlling said means, a thermostat in said circuit, said thermostat having a neutral position in which it is not effective, and two effective positions in which it controls the heat controlling means, an electric heating element arranged to supply artificial heat to the thermostat to return the thermostat to its neutral position in anticipation of the return of the temperature in the space heated to normal, and a rheostat operated by the heat controlling means in multiple steps of operation, with a predetermined time interval between steps for varying the degree of artificial heat in accordance with variations in the supply of heating medium.

12. In a system for the control of variations in temperaure from normal, comprising means for varying a supply of heating medium to the space to be heated, an electric circuit controlling said means, a thermostat in said circuit, said thermostat having a neutral position and two effective positions in which it controls the heat controlling means, an electric heating element arranged to supply artificial heat to the thermostat to return the thermostat to its neutral position in anticipation of the return of the temperature in the space heated to normal, and a rheostat operated by the heat regulating means for varying the degree of artificial heat in accordance with variations in the supply of heating medium.

13. In a heating system, comprising a circuit making and breaking thermostat having high and low temperature contacts and a movable contact member responsive to variations in temperature, a motor operated device, and means controlled thereby for controlling the temperature in the space to be heated, a control circuit connecting the motor operated device with the thermostat, a heating element in said circuit arranged to supply heat to the movable member of the thermostat, and rheostat operated by the motor operated device for varying the degree of heat in the heating element in anticipation of variations in temperature in the space to be heated, whereby said temperature tends to be maintained at a constant value.

14. In apparatus for the control of a temperature to maintain it in the neighborhood of a normal value comprising an electrically reversible motor and means operated thereby for varying the value of said temperature in either of two directions, a thermostat responsive to variations in said temperature adapted to control a source of electric energy to operate said motor in a direction intended to return said temperature to a normal value, a control circuit connecting said thermostat with said motor, limit switches in said circuit limiting the degree of operation of said motor in either of said two directions, a cam operated by said motor for opening either one or the other limit switch when the limit of operation is reached, a second cam normally holding both limit switches open but permitting closing of said switches at definite intervals and for predetermined periods of time, and a continuous running motor adapted to operate said cam whereby the first named motor is operated intermittently.

15. In a motor control system comprising a motor, a control circuit for said motor, limit switches in said circuit limiting the degree of operation of said motor in either of two directions, a timing motor and means operated thereby for normally holding said switches in an open circuit position but permitting closing of said switches at predetermined intervals whereby the first named motor is operated intermittently.

16. In a motor control system comprising an electrically reversible motor, a control circuit for said motor, a switch in said circuit adapted to control a source of electric energy for the operation of said motor, limit switches in said circuit limiting the degree of operation of said motor in either of two directions, means operated by said motor for opening either one or the other limit switch when the limit of operation is reached, a second motor and means operated thereby for normally holding said limit switches open but permitting closing of said switches at definite intervals and for predetermined periods of time by the operation of the last named motor whereby the first named motor is operated intermittently.

JAMES LEWIS KIMBALL.